United States Patent
Hammarlund et al.

(10) Patent No.: US 7,711,484 B2
(45) Date of Patent: May 4, 2010

(54) SYSTEM AND A METHOD FOR AUTOMATIC AIR COLLISION AVOIDANCE

(75) Inventors: Henrik Hammarlund, Linkoping (SE); Bengt-Goran Sundqvist, Linkoping (SE); Hasse Persson, Linkoping (SE); Jonas Lovgren, Linkoping (SE)

(73) Assignee: SAAB AB, Linköping (SE)

( * ) Notice: Subject to any disclaimer, the term of this patent is extended or adjusted under 35 U.S.C. 154(b) by 1283 days.

(21) Appl. No.: 11/162,089

(22) Filed: Aug. 29, 2005

(65) Prior Publication Data

US 2006/0293855 A1    Dec. 28, 2006

(30) Foreign Application Priority Data

Aug. 31, 2004    (EP)    ................... 04020615

(51) Int. Cl.
*G08G 1/16* (2006.01)
*G01S 13/00* (2006.01)

(52) U.S. Cl. ............... 701/301; 701/11; 342/29

(58) Field of Classification Search .......... 701/301, 701/4, 9, 11; 244/175; 342/29
See application file for complete search history.

(56) References Cited

U.S. PATENT DOCUMENTS

| | | | |
|---|---|---|---|
| 5,636,123 A | | 6/1997 | Rich et al. |
| 6,314,366 B1* | | 11/2001 | Farmakis et al. ............ 701/201 |
| 6,510,388 B1* | | 1/2003 | Sporrong et al. ............ 701/301 |
| 6,546,338 B2* | | 4/2003 | Sainthuile et al. ........... 701/301 |
| 7,098,810 B2* | | 8/2006 | Bateman et al. ............. 340/963 |
| 7,437,245 B2* | | 10/2008 | Ybarra et al. ............... 701/301 |
| 7,516,014 B2* | | 4/2009 | Hammarlund et al. ...... 701/301 |
| 2002/0022927 A1* | | 2/2002 | Lemelson et al. ........... 701/301 |
| 2004/0059504 A1* | | 3/2004 | Gray .......................... 701/301 |
| 2006/0293855 A1* | | 12/2006 | Hammarlund et al. ...... 701/301 |
| 2008/0140273 A1* | | 6/2008 | Deker .......................... 701/14 |

FOREIGN PATENT DOCUMENTS

EP    1329863 A    7/2003

* cited by examiner

*Primary Examiner*—Khoi Tran
*Assistant Examiner*—Brian J Broadhead
(74) *Attorney, Agent, or Firm*—Venable LLP; Eric J. Franklin

(57) ABSTRACT

A method and a system for avoiding collisions between aircraft. The method includes computing a default fly out maneuver regarding how the aircraft shall be maneuvered during a fly out action, predicting a fly away path including a prediction of the position of the aircraft during the fly out maneuver, sending information about the own fly away path to the other aircrafts, receiving information about fly away paths from the other aircrafts, detecting an approaching collision, and activating the fly out maneuver upon detecting an approaching collision. The method further includes carrying out the following steps after activation the fly out maneuver: receiving the current position of the aircraft, and calculating a compensated fly out maneuver for the aircraft based on the current position of the aircraft, the previously predicted position, and the default fly out maneuver.

9 Claims, 3 Drawing Sheets

SYSTEM AND A METHOD FOR AUTOMATIC AIR COLLISION AVOIDANCE

FIELD OF THE INVENTION

The present invention relates to a method for avoiding collisions between airborne aircraft, more particularly, it relates to avoiding collisions using automatic collision avoidance systems.

BACKGROUND OF THE INVENTION

The purpose of an Automatic Air Collision Avoidance System (ACAS) is to prevent collisions in the air between aircraft, each having the system. A fly out is an automatic maneuver performed to avoid collision with another aircraft. Once the fly out maneuver is activated, maneuvers ordered from the pilot are disregarded. Each aircraft with the system continuously computes an escape angle and load factor to be used by the aircraft during a fly out maneuver for the case of an approaching collision. The escape angle is a relative roll angle. At the same time the aircraft computes optimized fly away paths in the air. The fly away paths are computed by means of an aircraft response model. The fly away path is a prediction of the space within which the aircraft will be located with a certain probability if a fly out maneuver will occur.

The fly away path is a trajectory in the air surrounded with a cone shaped space. The size of the cone shaped space surrounding the trajectory depends on uncertainties in the prediction of the fly away path. The uncertainties in the prediction is for example due to inaccuracy of the aircraft response model, timing accuracy of fly out activation due to inaccuracy in the assumption of when the fly out maneuver will begin, and last instance maneuvering. The computed fly away path is sent to the other aircraft. When the other aircraft receive a fly away path, the path is booked. Thus, the booked fly away paths are known to all neighboring aircrafts having the system.

The aircraft continuously receive fly away paths from the other aircraft. The system detects an approaching collision based on the own fly away path and the fly away paths received from the other aircraft, and upon detecting an approaching collision activates the automatic fly out maneuver. During the fly out maneuver the aircraft is ordered to take the escape angle and load factor computed at the same time as the last booked fly away path. A collision is detected when the system detects that the own booked fly away path crosses a booked fly away path of another aircraft. The fly out maneuver should occur within a booked space that is known to the other aircrafts. If no collision is detected the system computes a new escape angle and load factor to be used during a fly out maneuver, and a new fly away path based on the fly away paths received from the other aircraft. The new fly away path is sent to the other aircraft.

A problem in connection with automatic air collision avoidance systems is that in some situations the uncertainties in the prediction are large. To make sure that the fly out maneuver is within the booked space of the fly away path, the width of the booked path is increased. When the width of the booked path is increased, the risk for nuisance is increased. With nuisance is meant an event, which results in an unintentional or unpredicted response or activation of the system. When the risk for unintentional or unpredicted activations of the fly out maneuver be-comes too high, the system for automatically avoiding collisions is turned off and by then the availability of the system is decreased.

This problem is particularly troublesome since the uncertainties are largest in situations where the risk for collision is high, and accordingly where the collision avoidance system is mostly needed. The uncertainties are particularly high in situation where the aircraft are maneuvered with much dynamic, for example during an air raid. The uncertainties are lowest when the aircraft is maneuvered on a straight line, and increase when the aircraft is turned. The increased uncertainties during dynamic maneuvering are due to increased uncertainties in the prediction of the fly away path, which depends on increased uncertainties in the aircraft response model, increased uncertainties in the input data to the model, and to increased uncertainties in the prediction of the start position of the fly out action due to last instant pilot maneuvering. Last instant pilot maneuvering is maneuvers ordered to the aircraft during the time delay between computing a fly away path and receiving and booking the fly away path by the other aircrafts.

OBJECTS AND SUMMARY OF THE INVENTION

The object of the present invention is therefore to provide a solution to the problem described above, which reduces the risk for nuisance and consequently improves the availability of the collision avoidance system According to one aspect of the invention this object is achieved by a method for avoiding collisions between own aircraft and one or more other aircraft.

According to the invention a compensated fly out maneuver for the aircraft is calculated during the fly out maneuver based on the current position of the aircraft during the fly out and the previously predicted position of the aircraft, which position was predicted before activation of the fly out and which is known to the other aircraft. The default maneuver is adjusted in such a way that the position of the aircraft approaches the previously predicted position, i.e. in such a way that the position of the aircraft approaches the booked fly away path. Thus, it is ensured that the aircraft flies within the booked space, i.e. within the fly away path known to the other aircrafts, during the fly out.

The invention takes care of and reduces computation uncertain-ties, uncertainties in the input data to the model, as well as uncertainties due to last instant pilot maneuvering. Thus, another advantage obtained is that the prediction of the fly out maneuver is simplified and the width of the booked space can be reduced which leads to that the risk for nuisance is decreased and consequently that the accessibility of the system is improved. A further improvement achieved is that the complexity of the prediction can be reduced.

According to an embodiment of the invention the method further comprises estimating a position of the aircraft at a future point in time, a time period ahead, based on the current position of the aircraft and the default fly out maneuver, and calculating a difference between said estimated position of the aircraft and the previously predicted position at said future point in time, and on bases thereof calculating the compensated fly out maneuver for the aircraft. A future position, estimated based on the current position, is compared with the predicted position at the same point in time. The difference in position between the estimated and the predicted position are used for determining a new control order to the aircraft to ensure that the difference between the real position and the prediction of the fly out maneuver is reasonable. Thanks to the fact that the comparison takes place a time period ahead, based on future positions, it is possible to adjust the fly out maneuver so well in time that it is ensured that the aircraft flies within the booked space. Preferably, the time period ahead is within the interval 0.2-2 seconds. Thus, a less stiff feedback is provided.

According to an embodiment of the invention the default fly out maneuver comprises a default fly out roll angle and a default fly out load factor, and calculating a compensated fly out maneuver for the aircraft comprises calculating a compensated roll angle and a compensated load factor command.

According to another aspect of the invention this object is achieved by a system.

According to a further aspect of the invention, the object is achieved by a computer program directly loadable into the internal memory of a computer or a processor, comprising software code portions for performing the steps of the method according to the invention, when said program is run on a computer. The computer program is provided either on a computer readable medium or through a network, such as the Internet.

According to another aspect of the invention, the object is achieved by a computer readable medium having a program recorded thereon, when the program is to make a computer perform the steps of the method according to the invention, and said program is run on the computer.

BRIEF DESCRIPTION OF THE DRAWINGS

The invention will now be explained more closely by the description of different embodiments of the invention and with reference to the appended figures.

DETAILED DESCRIPTION OF PREFERRED EMBODIMENTS OF THE INVENTION

Figure 1:
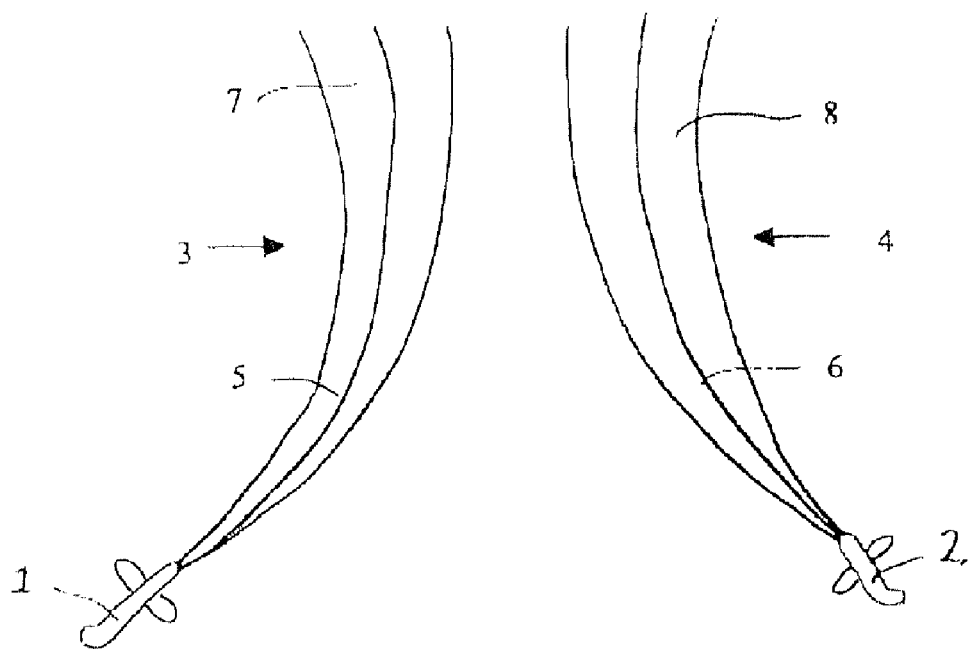
FIG. 1 shows fly away paths for two aircrafts.

FIG. 1 shows two aircrafts 1 and 2 each comprising an automatic collision avoidance system. Each aircraft computes a fly away path 3, 4. The fly away path describes a trajectory 5, 6 in the air, which is surrounded with a cone shaped space 7, 8. The width w of the cone shaped space 7, 8 surrounding the trajectory 5, 6 depend on uncertainties in the computation of the fly away path. The uncertainties, and consequently the width of the fly away path, increase with time. When an aircraft has computed a fly away path, information about the path is sent to other aircraft. The other aircraft book the space of the fly away path upon receiving it. The trajectory 5, 6 can be described as a function of time, and the information about the fly away path which is sent to the other aircraft comprises three points in the air, two velocity vectors in the flying function, and a value representing the uncertainties of the computation. The control systems of the other aircrafts then model a spline function using the received information. An approaching collision is detected when it is detected that the own computed fly away path crosses any of the fly away path of the other aircraft.

Figure 2:
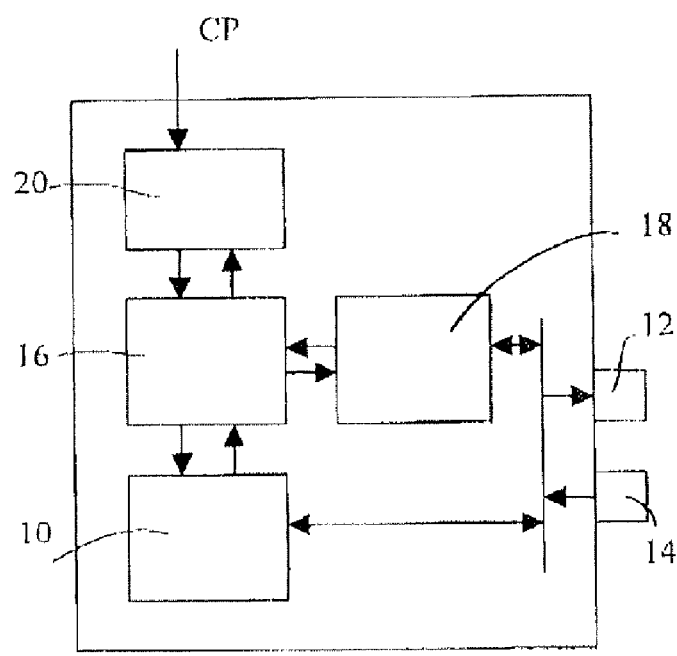
FIG. 2 shows a block diagram over a system for automatically avoiding collisions according to the invention.

FIG. 2 shows a system for automatic avoiding of collisions according to an embodiment of the invention. The system comprises a computing unit 10 adapted for computing a default fly out maneuver including an default escape angle, denoted EA, i.e. a roll angle, and a default load factor, denoted NZ, to be used during a fly out maneuver, and a fly away path to be sent to the other aircraft. The escape angle, the load factor and the fly away paths are computed based on an aircraft response model and fly away paths received from other aircrafts. The system comprises a sender 12 sending the computed fly away path to other aircrafts and a receiver 14 receiving fly away paths from the other aircraft.

The system also comprises a data storage 16 adapted for storing the computed escape angle, load factor and fly away path, and a collision handler 18 adapted to detect an approaching collision based on own fly away path and fly away paths received from the other aircraft and activating a fly away maneuver upon detecting an approaching collision. Further the system comprises a fly out maneuver compensating module 20 adapted to, during a fly out action, receive the current position CP of the aircraft and to calculate a compensated fly out maneuver for the aircraft based on the current position of the aircraft, the fly away path, and the default fly out maneuver. The system is preferably implemented in the control system of an aircraft, and uses the system computer of the aircraft.

The fly away path is predicted as a spline path in space as a function of time. The fly away path is sent to a flight control system of the aircraft. The flight control system then tries to follow to spline path during the fly out by position feed back. This means that the flight control system tries to correct errors in position relative to the predicted spline. A default fly out is implemented in the flight control system, which returns a default escape angle, denoted EA, in the form of a roll angle, and a default load factor, denoted NZ.

Figure 3:
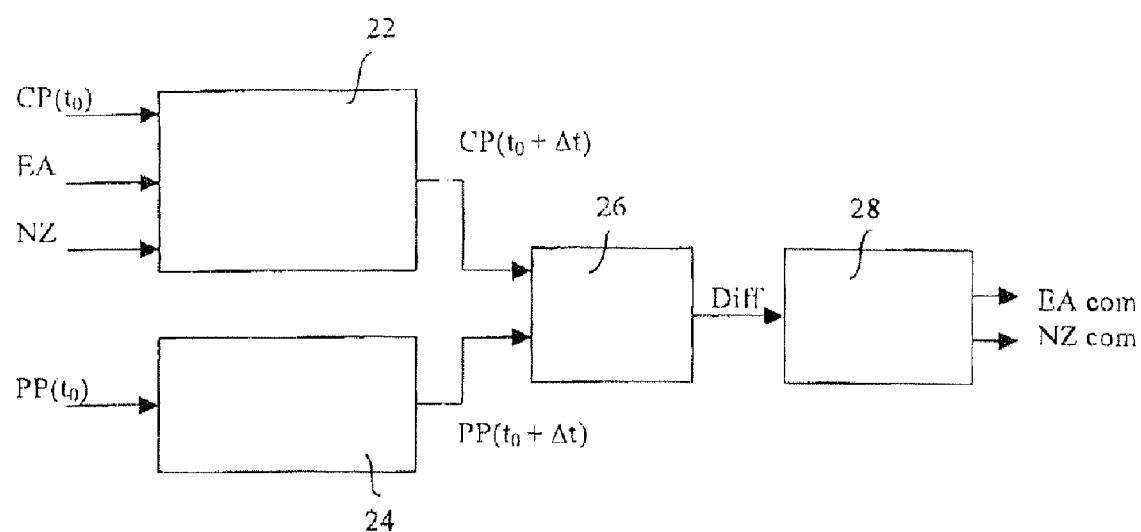
FIG. 3 shows a fly out maneuver compensating module according to an embodiment of the invention.

FIG. 3 shows an example of a fly out maneuver compensating module 18. The current position, denoted $CP(t_0)$, is received from the system computer of the aircraft and is used together with the EA and NZ to estimate a future position, denoted $CP(t_0+\Delta t)$, of the aircraft in an estimator 22. The current position is retrieved from the system computer in 60 Hz and it is monitored in the flight control system. The position is estimated a time period $\Delta t$ ahead $\Delta t$ is preferably within the interval 0.2-2 seconds. A predicted position $PP(t_0+\Delta t)$ at the same point in time, i.e. at $t_0+\Delta t$, is retrieved from the predicted fly away path by a predictor 24.

In comparator 26, the predicted position $PP(t_0+\Delta t)$ is compared to the estimated future position $CP(t_0+\Delta t)$ and the difference between the future positions, denoted Diff, is used to calculate a new compensated escape angle command and a new compensated load factor command. The comparison of the position is recommended to be made in a plane to which the predicted fly away path is the normal. An alternative could be to calculate both positions for specific time horizon, but only calculate the difference in future positions in the plane to which the predicted fly away path is the normal. This results in an error dependent of the difference in timing.

In an estimator 28, an adjustment factor $\Delta EA$ for the escape angle and an adjustment factor $\Delta NZ$ for the load factor is estimated from the calculated difference in future position. $\Delta EA$ and $\Delta NZ$ are used for calculating compensated EA and NZ command. The estimate of the future position from current position uses the current position and the default fly out maneuver as input to the position prediction. Since the aircraft will not perform the default maneuver, it will result in a model error which for example could be taken care of by using the escape angle and load factor command calculated in the previous step as an additional input to the estimate of the future position.

Figure 4:
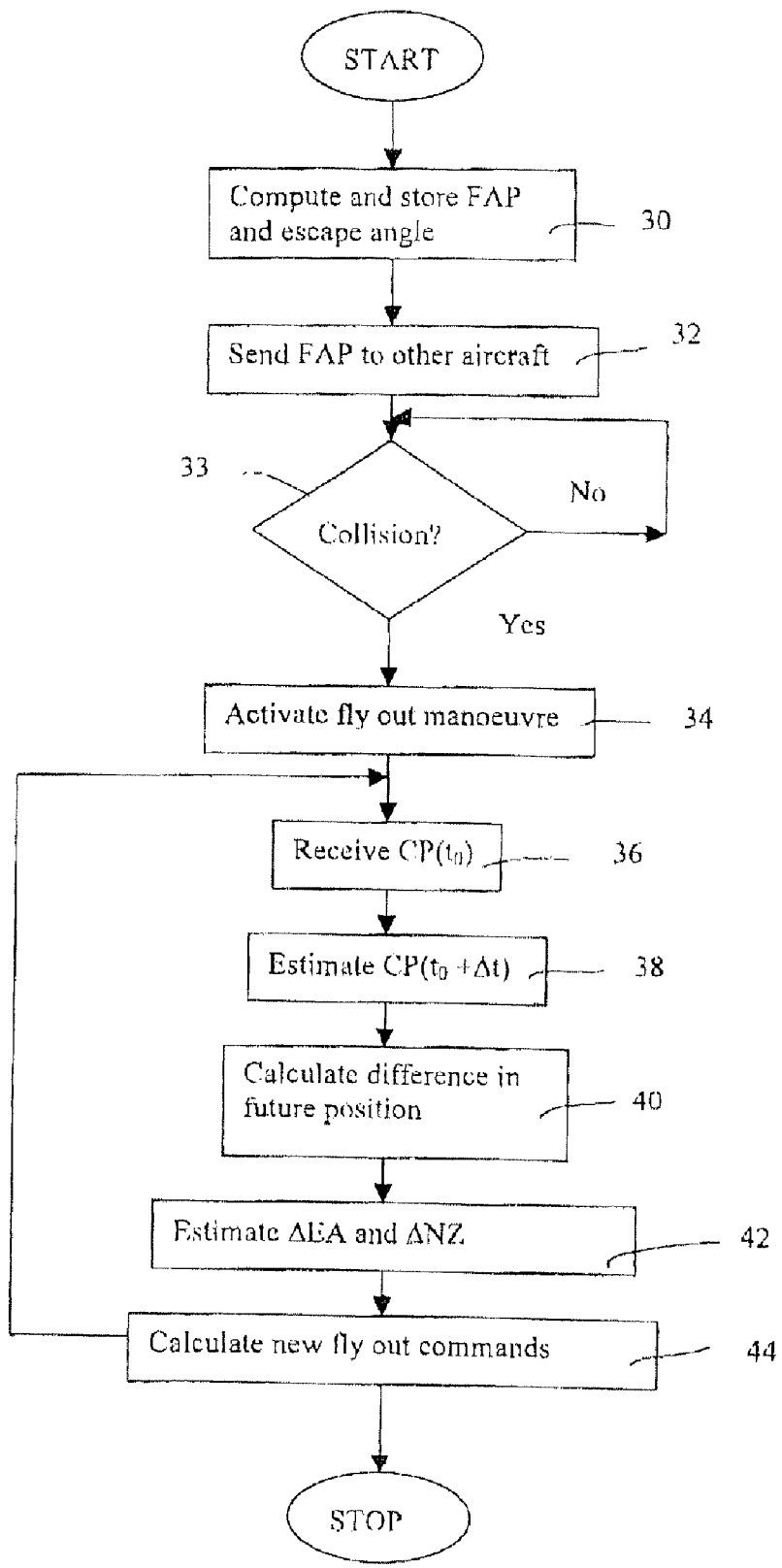
FIG. 4 shows a flow diagram over a method for automatically avoiding collisions according to an embodiment of the invention.

FIG. 4 shows a flow diagram of a method and computer program product according to an embodiment of the present invention. It will be understood that each block of the flow diagram can be implemented as computer program instruction. As shown in block 30, an escape angle EA, a load factor NZ and a fly away path, denoted FAP, are computed and stored. The fly away path is sent to the other aircrafts for booking of the path, block 32. Then, the system waits for receiving fly away path from the other aircrafts, block 33. When fly away paths are received from the other aircrafts it is detected whether there is an approaching collision or not, block 33. In this embodiment of the invention detecting an approaching collision means detecting lack of distance between booked spaces. If a collision is detected the fly out maneuver is activated, block 34.

During the fly out maneuver the computed EA and NZ are adjusted based on the position of the aircraft, according to the steps in block 36-44. A current position $CP(t_0)$ of the aircraft is received, block 36. The position of the aircraft a time period ahead $CP(t_0+\Delta t)$ is estimated based on the current position of the aircraft and the computed EA and NZ, block 38. A previously predicted position $PP(t_0+\Delta t)$ for the same point in time (the same time period ahead) is retrieved from the stored FAP. The difference between the estimated position of the aircraft and the previously predicted position $PP(t_0+\Delta t)$ is calculated, block 40. $\Delta EA$ and $\Delta NZ$ are calculated from the calculated difference in future position, block 42. Thereafter, a compensated fly out maneuver for the aircraft is calculated, including new fly out commands based on $\Delta EA$ and $\Delta NZ$, block 44. The compensated fly out maneuver for the aircraft is calculated so that the deviation between a performed fly out path and the predicted fly away path is reduced. This means that the deviation between the fly out path performed during the activation of the system and the booked fly out path is reduced and, thus that the risk that the aircraft will not be able to follow a booked fly away path is reduced. The steps 36-44 are repeated during the fly out maneuver.

Although the invention has been described in some respects with reference to specified embodiments, variations and modifications will become apparent to those skilled in the art. For example, the invention is applicable for manned as well as unmanned aircraft. It is therefore the intention that the following claims not be given a restrictive interpretation but should be viewed to encompass variations and modifications that are derived from the inventive subject matter disclosed.

What is claimed is:

1. A method for avoiding collisions between own aircraft and one or more other aircraft, each aircraft comprising an automatic collision avoidance system, the method comprising:
    computing a default fly out maneuver regarding how the aircraft shall be maneuvered during a fly out action,
    predicting a fly away path comprising a prediction of the position of the aircraft during the fly out maneuver,
    sending information about the own fly away path to the other aircraft,
    receiving information about fly away paths from the other aircraft,
    detecting an approaching collision based on the own fly away path and the fly away paths received from the other aircraft, and
    activating the fly out maneuver upon detecting an approaching collision, and
    wherein the following steps are carried out after activation the fly out maneuver:
        receiving the current position of the aircraft, and
        calculating a compensated fly out maneuver for the aircraft based on the current position of the aircraft, said previously predicted position, and the default fly out maneuver, wherein the compensated fly out maneuver is calculated by adjusting the default fly out maneuver in such a way that the position of the aircraft approaches the previously predicted position, thereby reducing the deviation between a performed fly out path and the predicted fly away path.

2. The method according to claim 1, further comprising:
    estimating a position of the aircraft at a future point in time, a time period ahead, based on the current position of the aircraft and the default fly out maneuver,
    calculating a difference between said estimated position of the aircraft and the previously predicted position at said future point in time, and
    based on the difference calculating the compensated fly out maneuver for the aircraft.

3. The method according to claim 2, wherein said time period ahead is within the interval 0.2-2 seconds.

4. The method according to claim 1, wherein computing a default fly out maneuver comprises computing a default fly out roll angle and a default fly out load factor, and calculating a compensated fly out maneuver for the aircraft comprises calculating a compensated roll angle and a compensated load factor command.

5. A computer program product, comprising:
    a computer readable medium; and
    computer program instructions recorded on the computer readable medium and executable by a digital computer, the computer program instructions for carrying out a method for avoiding collisions between own aircraft and one or more other aircraft, wherein each aircraft comprises an automatic collision avoidance system, the program code comprising instructions for:
    computing a default fly out maneuver regarding how the aircraft shall be maneuvered during a fly out action,
    predicting a fly away path comprising a prediction of the position of the aircraft during the fly out maneuver,
    sending information about the own fly away path to the other aircraft,
    receiving information about fly away paths from the other aircraft,
    detecting an approaching collision based on the own fly away path and the fly away paths received from the other aircraft, and
    activating the fly out maneuver upon detecting an approaching collision,
    wherein the following steps are carried out after activation the fly out maneuver:
        receiving the current position of the aircraft, and
        calculating a compensated fly out maneuver for the aircraft based on the current position of the aircraft, said previously predicted position, and the default fly out maneuver, wherein the compensated fly out maneuver is calculated by adjusting the default fly out maneuver in such a way that the position of the aircraft approaches the previously predicted position, thereby reducing the deviation between a performed fly out path and the predicted fly away path.

6. A system for automatically avoiding collisions between own aircraft and one or more other aircrafts, the system comprising:
    a default fly out computing unit adapted to compute a default fly out maneuver regarding how the aircraft shall be maneuvered during a fly out action, and based thereon predicting a fly away path comprising a prediction of the position of the aircraft during the fly out,
    a sender adapted to send information about the computed fly away path to the other aircraft,
    a receiver adapted to receive information about fly away paths from the other aircraft, a collision handler adapted to detect an approaching collision based on the computed fly away path and the fly away paths received from the other aircraft, and to activate a fly away maneuver upon detecting an approaching collision, and a fly out maneuver compensating module adapted to, during a fly out action, receive a current position of the aircraft, and to calculate a compensated fly out maneuver for the aircraft based on the current position of the aircraft, said previously predicted position, and the default fly out maneuver, wherein the compensated fly out maneuver is calculated by adjusting the default fly out maneuver in such a way that a position of the aircraft approaches the previously predicted position, thereby reducing a deviation between a performed fly out path and the predicted fly away path.

7. The system according to claim 6, wherein said default fly out computing unit is adapted to estimate a position of the aircraft at a future point in time, a time period ahead, based on the current position of the aircraft and the default fly out maneuver, and to calculate a difference between said estimated position of the aircraft and said previously predicted position at said future point in time, and based thereon to calculated the compensated fly out maneuver for the aircraft.

8. The system according to claim 7, wherein said time period ahead is within the interval 0.2-2 seconds.

9. The system according to claim 6, wherein said default fly out computing unit is adapted to compute a default fly out maneuver comprising a default fly out roll angle and a default fly out load factor, and said fly out maneuver compensating module is adapted to calculate a compensated fly out maneuver comprising a compensated roll angle and a compensated load factor command.

* * * * *